United States Patent
Morita et al.

(10) Patent No.: US 11,318,899 B2
(45) Date of Patent: *May 3, 2022

(54) BUMPER REINFORCEMENT

(71) Applicant: Kobe Steel, Ltd., Kobe (JP)

(72) Inventors: Shinya Morita, Shimonoseki (JP);
Narikazu Hashimoto, Shimonoseki (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,717

(22) Filed: Apr. 15, 2019

(65) Prior Publication Data

US 2019/0344736 A1 Nov. 14, 2019

(30) Foreign Application Priority Data

May 8, 2018 (JP) .............................. JP2018-090253

(51) Int. Cl.
*B60R 19/18* (2006.01)
*B60R 19/02* (2006.01)
*C22C 21/10* (2006.01)

(52) U.S. Cl.
CPC ............ *B60R 19/18* (2013.01); *B60R 19/023* (2013.01); *C22C 21/10* (2013.01); *B60R 2019/182* (2013.01)

(58) Field of Classification Search
CPC .. B60R 19/18; B60R 19/023; B60R 2019/182
USPC ....................................................... 293/155
See application file for complete search history.

(56) References Cited

U.S. PATENT DOCUMENTS

| 5,059,056 | A  | * | 10/1991 | Banthia ............... | A47B 47/0008 |
| | | | | | 296/203.01 |
| 10,562,087 | B2 | * | 2/2020 | Morita .................... | C22C 21/10 |
| 2007/0128463 | A1 | * | 6/2007 | Dixon .................. | B32B 15/016 |
| | | | | | 428/654 |
| 2016/0114747 | A1 | | 4/2016 | Ishitobi et al. | |
| 2019/0152304 | A1 | * | 5/2019 | Yoshida ................ | B60J 5/0444 |
| 2019/0314882 | A1 | * | 10/2019 | Bishop ................ | G01B 11/272 |
| 2019/0389286 | A1 | * | 12/2019 | Yoshida ................ | B60J 5/0443 |

FOREIGN PATENT DOCUMENTS

| DE | 202015102899 | U1 | * | 10/2015 | ............ F16L 9/02 |
| EP | 3489055 | A1 | * | 5/2019 | ........... B60J 5/0483 |
| JP | 7-227618 | A | | 8/1995 | |
| JP | 2003127808 | A | * | 5/2003 | |

(Continued)

OTHER PUBLICATIONS

Machine translation of JPH '618 from espacenet (Year: 1995).*

(Continued)

*Primary Examiner* — Hilary L Gutman
(74) *Attorney, Agent, or Firm* — Oblon, McClelland, Maier & Neustadt, L.L.P.

(57) ABSTRACT

A bumper reinforcement includes an aluminum alloy extrusion body having a pair of flanges to be positioned on a vehicle body side and on a collision side and a pair of webs to be positioned in a vehicle vertical direction. The pair of webs connect the pair of flanges at joint portions such that the pair of webs and the pair of flanges form a closed cross section, and the pair of webs do not have a welded portion.

13 Claims, 3 Drawing Sheets

(56) References Cited

FOREIGN PATENT DOCUMENTS

| JP | 2003154407 A | * | 5/2003 | | |
|---|---|---|---|---|---|
| JP | 2003285703 A | * | 10/2003 | | |
| JP | 2006233336 A | | 9/2006 | | |
| JP | 2007231408 A | * | 9/2007 | | |
| JP | 2009-45672 | | 3/2009 | | |
| JP | 2009-197269 A | | 9/2009 | | |
| JP | 2009197269 A | * | 9/2009 | | |
| JP | 2010046685 A | * | 3/2010 | | |
| JP | 2010-181020 A | | 8/2010 | | |
| JP | 10-306338 | | 11/2010 | | |
| JP | 2011177765 A | * | 9/2011 | | |
| JP | 2014145119 A | * | 8/2014 | .............. | C22F 1/053 |
| JP | 2015168299 A | * | 9/2015 | | |
| WO | WO-2008123184 A1 | * | 10/2008 | .............. | C22F 1/053 |
| WO | WO 2012/147179 A1 | | 11/2012 | | |

OTHER PUBLICATIONS

Machine translation of JP 765 (Year: 2011).*
Machine translation of JP2003154407 (Year: 2003).*
Machine translation of JP2003127808 (Year: 2003).*
Machine translation of JP2010046685 (Year: 2010).*
Extended European Search Report dated Jul. 5, 2019 in European Patent Application No. 19170032.7, 7 pages

* cited by examiner

BUMPER REINFORCEMENT

BACKGROUND

The present invention relates to a bumper reinforcement formed of an aluminum alloy extrusion with a closed-section structure.

A bumper reinforcement formed of an aluminum alloy extrusion typically includes a pair of flanges (inner flange located on the inside (vehicle body side) in a vehicle front-back direction and outer flange located on the outside (collision side) in the direction) and a pair of webs connecting the flanges together. The bumper reinforcement has a closed-section structure formed by the pair of flanges and the pair of webs. One or more middle rib connecting the flanges together is formed between the webs as necessary.

The aluminum alloy extrusion with such a closed-section structure is manufactured using a hollow die such as a porthole die, a bridge die, and a spider die. For example, an extrusion method using the porthole die uses a porthole die including a combination of a mandrel body having a plurality of portholes and a die. An aluminum billet is squeezed into the porthole die and divided into pieces by the portholes, and then the pieces are integrated again by welding while surrounding the mandrel. The inner surface of such a product is shaped by the mandrel while the outer surface thereof is shaped by the die, resulting in formation of an extrusion with a closed-section structure. Thus, welded portions necessarily exist in the aluminum alloy extrusion with the closed-section structure manufactured using the hollow die.

In the aluminum alloy extrusion having the welded portions, each welded portion has a microstructure different from that of any other portion (normal portion), and the welded portion disadvantageously has low mechanical properties, for example, a low fracture limit compared with the normal portion. For the bumper reinforcement formed of the aluminum alloy extrusion, such a low fracture limit of the welded portion may cause a reduction in strength and energy absorption of the bumper reinforcement as an energy absorbing member.

The aluminum alloy extrusion with the closed-section structure having the welded portions has been investigated to improve mechanical properties of the welded portion by adjusting a material composition or a manufacturing condition as described in Japanese Unexamined Patent Application Publication Nos. Hei10(1998)-306338, 2003-154407, 2007-231408, and 2009-45672, for example.

SUMMARY

However, it is still difficult to equalize the mechanical properties between the welded portion and the normal portion of the aluminum alloy extrusion even by such adjustment of the material composition or the manufacturing condition.

The invention aims to prevent the bumper reinforcement formed of the aluminum alloy extrusion with the closed-section structure having such welded portions from easily fracturing during collision.

According to an aspect of the present invention, a bumper reinforcement includes an aluminum alloy extrusion body having a pair of flanges to be positioned on a vehicle body side and on a collision side and a pair of webs to be positioned in a vehicle vertical direction. The pair of webs connect the pair of flanges at joint portions such that the pair of webs and the pair of flanges form a closed cross section, and the pair of webs do not have a welded portion.

In the aspect of the present invention, the welded portions are not provided in the pair of webs, which makes it possible to avoid each welded portion from becoming a starting point of buckling deformation of the web during collision, and thus prevent each web from easily fracturing during collision.

DETAILED DESCRIPTION

Figure 1A:
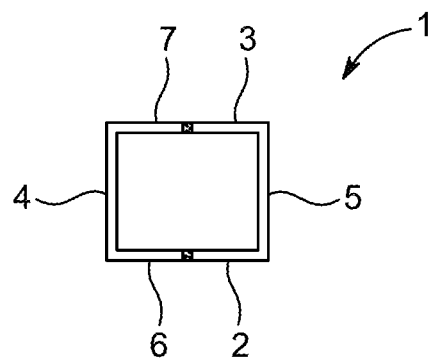
FIG. 1A is a cross section of a bumper reinforcement according to an embodiment of the present invention.
Figure 1B:
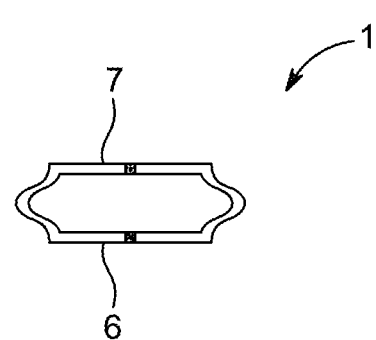
FIG. 1B is a cross section of the bumper reinforcement which is bent and deformed due to a collision.

An embodiment of a bumper reinforcement of the invention is now described with reference to FIGS. 1A and 1B. A bumper reinforcement 1 of FIG. 1A is formed of an aluminum alloy extrusion with a closed-section structure having welded portions along a longitudinal direction (extrusion direction). The closed-section structure includes a pair of flanges located on a vehicle body side and on a collision side (vehicle body-side flange 2 and collision-side flange 3) with a space therebetween, and a pair of webs 4 and 5 located in a vehicle vertical direction with a space therebetween and connecting the flanges 2 and 3 together. In the cross-section shown in FIG. 1A, the pair of flanges 2, 3 and the pair of webs 4, 5 are formed perpendicularly to each other while each having a plate-like shape.

Although no projecting flange is provided on both ends of the respective flanges 2 and 3 in the bumper reinforcement 1 of FIG. 1A, the projecting flange may be provided on one or both of the flanges in a sectional shape (for example, see Japanese Unexamined Patent Application Publication No. 2003-127808).

In the bumper reinforcement 1, welded portions 6 and 7 are formed in the flanges 2 and 3, respectively. The welded portions 6 and 7 are formed along the longitudinal direction (extrusion direction of the aluminum alloy extrusion) of the bumper reinforcement 1.

The welded portions 6 and 7 are located at appropriate positions without limitation in the width directions of the flanges 2 and 3, respectively. In light of preventing the welded portions 6 and 7 from each becoming a starting point of cracking during collision, however, the welded portions 6 and 7 are preferably located at positions between the webs 4 and 5 rather than the respective joint portions between the flanges 2, 3 and the webs 4, 5, and more preferably at central portions between the webs 4 and 5 (positions at each of which a distance from the web 4 is the same as a distance from the web 5) as shown in FIG. 1A.

An aluminum alloy extrusion with a closed-section structure as a material of the door beam 1 is manufactured using a hollow die such as a porthole die, a bridge die, and a spider die. The welded portions 6 and 7, which are each formed by temporarily dividing a metal flow in the hollow die and then integrating the divided metal flows, exist along a longitudinal direction (extrusion direction) of the aluminum alloy extrusion, and each have a microstructure different from that of a portion (normal portion) other than the welded portions. The aluminum alloy extrusion as a whole has one aluminum alloy composition.

Figure 2A:
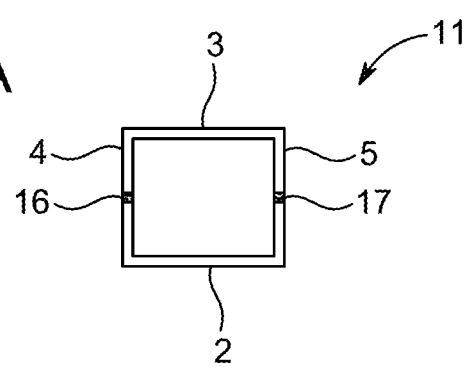
FIG. 2A is a cross section of a bumper reinforcement according to another embodiment of the present invention.

FIG. 2A illustrates a sectional view of another embodiment of bumper reinforcement 11, which is different from the bumper reinforcement 1 (FIG. 1A) according to the present disclosure. In the bumper reinforcement 11 of FIG. 2A, substantially the same portion as that of the bumper reinforcement 1 of FIG. 1A is designated by the same numeral.

The bumper reinforcement 11 is formed of an aluminum alloy extrusion with a closed-section structure having welded portions along the longitudinal direction (extrusion direction).

However, the bumper reinforcement 11 is different from the bumper reinforcement 1 in that welded portions 16 and 17 are formed in the webs 4 and 5, respectively. As with the welded portions 6 and 7 of the bumper reinforcement 1, the welded portions 16 and 17 are formed along the longitudinal direction of the bumper reinforcement 11 (extrusion direction of the aluminum alloy extrusion).

Figure 3A:
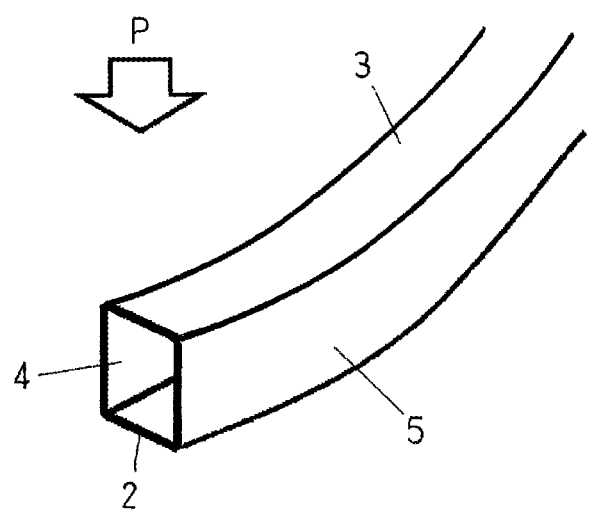
FIG. 3A illustrates a shape of a bumper reinforcement in a first half of collision.
Figure 3B:
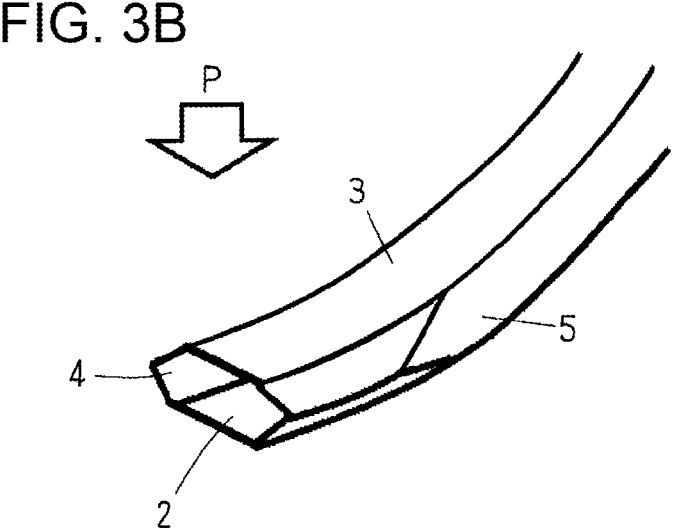
FIG. 3B illustrates a shape of the bumper reinforcement in a second half of collision.

When a collision load P is applied to the bumper reinforcement 1, 11, the bumper reinforcement 1, 11 undergoes bending-deformation with a vehicle vertical direction as a rotational axis, and tensile strain occurs in the vehicle body-side flange 2 while compressive strain occurs in the collision-side flange 3 in the first half of collision (FIG. 3A). Subsequently, in the second half of collision (FIG. 3B), each of the webs 4 and 5 is buckled and bending-deformed about its intermediate region in the vehicle front-back direction.

The bumper reinforcement is required to have high energy absorption because it receives a collision load. To secure a high energy absorption, it is necessary to allow each web to be buckled to relieve tensile strain occurring in the flange on the vehicle body side (collision back side) so as to prevent fracture of the vehicle body-side flange particularly in the second half of collision. During buckling, the web is bending-deformed about its intermediate region in the vehicle front-back direction, and local strain concentration occurs in the region. When the web has a welded portion having a low fracture limit, the web tends to be early buckled and deformed starting from the welded portion, or the welded portion easily fractures in the second half of collision, so that energy absorption performance may be reduced thereafter.

Figure 2B:
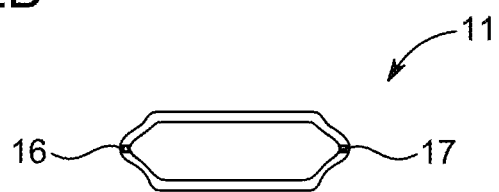
FIG. 2B is a cross section of the bumper reinforcement which is bent and deformed due to a collision.

For the bumper reinforcement 11, the welded portions 16 and 17 are formed in the respective webs 4 and 5 in which strain concentration tends to occur. In the second half of collision (FIG. 2B), therefore, the respective webs 4 and 5 are early buckled and deformed starting from the welded portions 16 and 17 or easily fracture at the welded portions 16 and 17, respectively, so that energy absorption performance is reduced thereafter.

For the bumper reinforcement 1, the welded portions 6 and 7 are not formed in the webs 4 and 5, respectively. Hence, the welded portions 6 and 7 are avoided from becoming starting points of buckling deformation of the webs 4 and 5, respectively, and the webs 4 and 5 are less likely to fracture in the second half of collision (FIG. 1B), making it possible to prevent energy absorption performance from being reduced.

In the bumper reinforcement 1, the welded portions 6 and 7 are formed in the flanges. Hence, large strain occurs in each of the welded portions 6 and 7 during bending deformation of the flanges 2 and 3 with the vehicle vertical direction as a rotational axis in the first half of collision. In such a bending deformation mode, however, the respective flanges 2 and 3 as a whole receive a tensile or compressive load in the longitudinal direction unlike the bending deformation due to buckling of the respective webs 4 and 5. In addition, the welded portions 6 and 7 occupy a relatively small area of the entire flanges 2 and 3, respectively. Hence, the welded portions 6 and 7 cause negligibly slight reductions in strength of the flanges 2 and 3, respectively. In addition, deformations of the welded portions 6 and 7 are suppressed by a material (normal portion) around the respective welded portions 6 and 7. As a result, the welded portions 6 and 7 are less likely to fracture.

Figure 4:
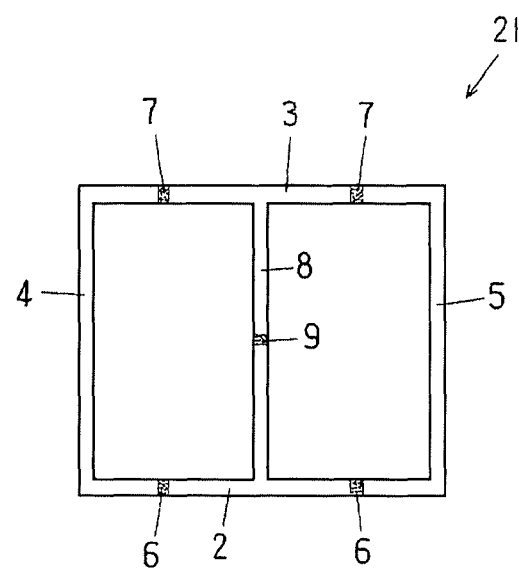
FIG. 4 is a cross section of a bumper reinforcement according to still another embodiment of the present invention.

FIG. 4 shows a sectional view of still another embodiment of the bumper reinforcement of the invention. In a bumper reinforcement 21 of FIG. 4, substantially the same portion as that of the bumper reinforcement 1 of FIG. 1A is designated by the same numeral.

The bumper reinforcement 21 corresponds to the bumper reinforcement 1 in having a pair of flanges 2 and 3 and a pair of webs 4 and 5, but is different from the bumper reinforcement 1 in that a middle rib 8 vertically connecting the flanges 2 and 3 together is formed at a middle position between the webs 4 and 5. Along with formation of the middle rib 8, welded portions 6 and 6 are formed at positions between the middle rib 8 and the respective webs 4 and 5 in the flange 2 of the bumper reinforcement 21, welded portions 7 and 7 are formed at positions between the middle rib 8 and the respective webs 4 and 5 in the flange 3, and a welded portion 9 is formed in the middle rib 8.

In the bumper reinforcement 21, no welded portion, which is to be a starting point of buckling deformation during collision, is formed in the webs 4 and 5. Hence, as with the bumper reinforcement 1, early buckling and fracture of the web 4 or 5 are less likely to occur during collision, making it possible to prevent a reduction in energy absorption performance due to the welded portion. The bumper reinforcement 21 has a welded portion 9 in the middle rib 8. However, when the bumper reinforcement 21 is bending-deformed during collision, since the middle rib 8 is less likely to receive a couple of forces and thus does not tend to fall down, the middle rib 8 predominantly undergoes in-plane deformation. In the middle rib 8, therefore, buckling deformation starting from the welded portion 9 or occurrence of fracture of the welded portion 9 is delayed compared with the case where the webs 4 and 5 have the welded portions 16 and 17, respectively (FIG. 2A). Hence, influence of the welded portion 9 formed in the middle rib 8 (on energy absorption performance) is small compared with the welded portions 16 and 17 formed in the webs 4 and 5, respectively.

The aluminum alloy extrusion is subjected to plastic working as necessary. As a result, the bumper reinforcement of the invention may have various forms in plan view. A known form in plan view may include a shape formed by bend forming of an extrusion over its entire length (so-called large R bending) so that the extrusion is convexly curved outward in the vehicle front-back direction (for example, see Japanese Unexamined Patent Application Publication No. 2010-046685), a shape formed by bend forming of two longitudinal ends of a bumper reinforcement toward a vehicle body (for example, see Japanese Unexamined Patent Application Publication No. 2003-285703), and a shape formed by crushing of a longitudinal part of an extrusion (for example, see Japanese Unexamined Patent Application Publication No. 2015-168299).

Figure 5:
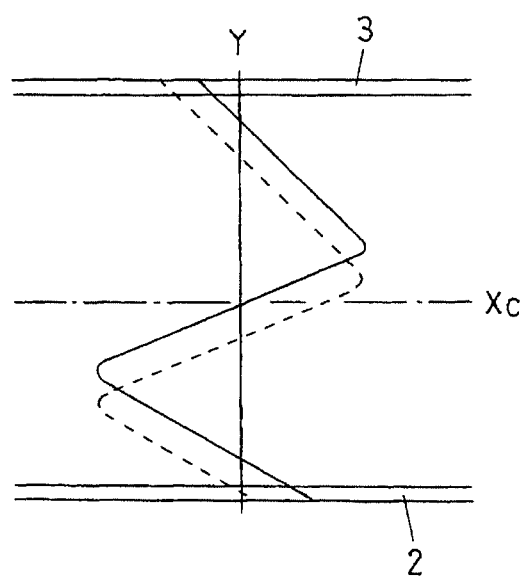
FIG. 5 schematically illustrates residual stress distribution along a cross-section of the bumper reinforcement subjected to large R bending.

When the bend forming is performed through simple bending, in which no tensile strength is applied in the longitudinal direction, and when the bumper reinforcement has a shape being convexly curved outward in the vehicle front-back direction, residual stress distribution in the bumper reinforcement is roughly as shown by a solid line in FIG. 5. Xc indicates a neutral axis of bending, and the right side of an axis Y shows tensile stress while the left side thereof shows compressive stress. The residual tensile stress is maximized at a position slightly close to the collision-side flange 3 from the neutral axis Xc. When the bend forming is performed through tensile bending, the residual stress distribution in the bumper reinforcement is roughly as shown by a broken line in FIG. 5. The neutral axis Xc of bending is shifted toward the vehicle body-side flange 2 by tensile force, thereby the residual tensile stress is maximized at a position close to the inner flange 2 compared with the case of simple bending. In each case, large tensile stress remains in a roughly central region in a vehicle width direction of each of the webs 4 and 5 in the bumper reinforcement subjected to bend forming.

In the aluminum alloy extrusion with the closed-section structure, the welded portion tends to induce stress corrosion cracking compared with any other portion (normal portion). If such a welded portion exists in the roughly central region in the vehicle width direction of the web 4 or 5, in which large tensile stress remains, stress corrosion cracking tends to occur in the central region. On the other hand, in the embodiment of the bumper reinforcement of the invention (FIG. 1A), the welded portions 6 and 7, in which stress corrosion cracking tends to occur, are not formed in the respective webs 4 and 5 in which large tensile stress remains due to bend forming. Hence, stress corrosion cracking is less likely to occur in the webs 4 and 5 compared with the bumper reinforcement in which the welded portions 16 and 17 are formed in the respective webs 4 and 5 (FIG. 2A), allowing heavier bend forming. In still another embodiment of the bumper reinforcement of the invention (FIG. 4), although the welded portion 9 is formed in the middle rib 8, since the webs 4 and 5 having no welded portion are located on both sides of the middle rib 8, even if stress corrosion cracking occurs in the middle rib 8, influence of such stress corrosion cracking is limitative.

When at least a longitudinal part of the bumper reinforcement is subjected to press working (crushing), the webs 4 and 5 are bending-deformed and a space between the flanges 2 and 3 is reduced in a portion subjected to the crushing (crushed portion). As a result of the crushing, large tensile stress remains in a boundary region between a crushed portion and an uncrushed portion of each of the webs 4 and 5 (see Japanese Unexamined Patent Application Publication No. 2014-145119). In the bumper reinforcement of the embodiment of the invention (FIG. 1A), however, since the welded portions 6 and 7 are not formed in the respective webs 4 and 5, stress corrosion cracking is less likely to occur in the webs 4 and 5 compared with the bumper reinforcement in which the welded portions 16 and 17 are formed in the respective webs 4 and 5 (FIG. 2A), allowing heavier crushing. In addition, the welded portions 6 and 7 are not formed in the respective webs 4 and 5, which advantageously increases the fracture limit during crushing. In still another embodiment of the bumper reinforcement of the invention (FIG. 4), although the welded portion 9 is formed in the middle rib 8, since the webs 4 and 5 having no welded portion are located on both sides of the middle rib 8, even if stress corrosion cracking occurs in the middle rib 8, influence of such cracking is limitative.

While a high-strength 7000-series aluminum alloy extrusion has a lower fracture limit than a 6000-series aluminum alloy extrusion and tends to induce stress corrosion cracking, it can be preferably, but not limitedly, used as the aluminum alloy extrusion as a material of the bumper reinforcement. A composition defined in JIS or the AA standard can be used as a composition of the 7000-series aluminum alloy. A preferred composition may contain, in percent by mass, Zn: 3 to 8, Mg: 0.4 to 2.5, Cu: 0.05 to 2.0, Ti: 0.005 to 0.2, and at least one of Mn: 0.01 to 0.3, Cr: 0.01 to 0.3, and Zr: 0.01 to 0.3, with the remainder consisting of Al and impurities.

This application claims the benefits of priority to Japanese Patent Application No. 2018-090253, filed May 8, 2018. The entire contents of the above application are herein incorporated by reference.

What is claimed is:

1. A bumper reinforcemnt, comprising:
   an aluminum alloy extrusion body having a pair of flanges to be positioned on a vehicle body side and on a collision side and a pair of webs to be positioned in a vehicle vertical direction,
   wherein the pair of webs connect the pair of flanges at joint portions such that the pair of webs and the pair of flanges form a closed cross section,
   wherein each of the pair of flanges has a welded portion,
   wherein the pair of webs do not have a welded portion,
   wherein the joint portions do not have a welded portion, and
   wherein the pair of flanges are perpendicular to the pair of webs.

2. The bumper reinforcement according to claim 1, wherein each of the pair of flanges has the welded portion between the joint portions.

3. The bumper reinforcement according to claim 1, wherein the aluminum alloy extrusion body has a middle rib connecting the pair of flanges and positioned between the pair of webs.

4. The bumper reinforcement according to claim 2, wherein the aluminum alloy extrusion body has a middle rib connecting the pair of flanges and positioned between the pair of webs.

5. The bumper reinforcement accordingto claim 3, wherein the middle rib has an additional welded portion.

6. rhe bumper reinforcement according to claim 4, wherein the middle rib has an additional welded portion.

7. The bumper reinforcement according to claim 3, wherein each of the pair of flanges has the welded portion at a position not connected to the middle rib.

8. the bumper reinforcement according to claim 4, wherein each of the pair of flanges has the welded portion at a position not connected to the middle rib.

9. The bumper reinforcement according to claim 5, wherein each of the pair of flanges has the welded portion at a position not connected to the middle rib.

10. The bumper reinforcement according to claim 6, wherein each of the pair of flanges has the welded portion at a positio not connected to the middle rib.

11. The bumper reinforcement according to claim 1, wherein the aluminum alloy extrusion body comprises a 7000-series aluminum alloy.

12. The bumper reinforcement according to claim 10, wherein the aluminum alloy extrusion body comprises an aluminum alloy including Al, 3-8 mass % of Zn, 0.4-2.5 mass % of Mg, 0.05 to 2.0 mass % of Cu, and 0.005 to 0.2 mass % of Ti, and further including at least one of 0.01 to 0.3 mass % of Mn, 0.01 to 0.3 mass % of Cr, and 0.01 to 0.3 mass % of Zr.

13. The bumper reinforcement according to claim 1, wherein each of the pair of flanges do not have a projection.

* * * * *